Oct. 8, 1968  T. H. BRIGGS  3,405,270
INTERNAL FLAW DETECTION USING COLLIMATED BEAMS
Filed Aug. 6, 1965  2 Sheets-Sheet 1
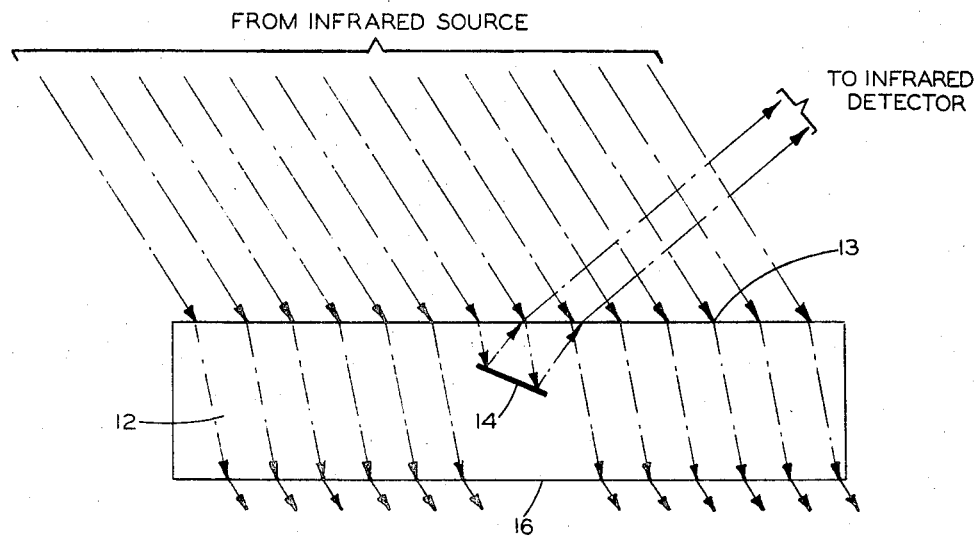
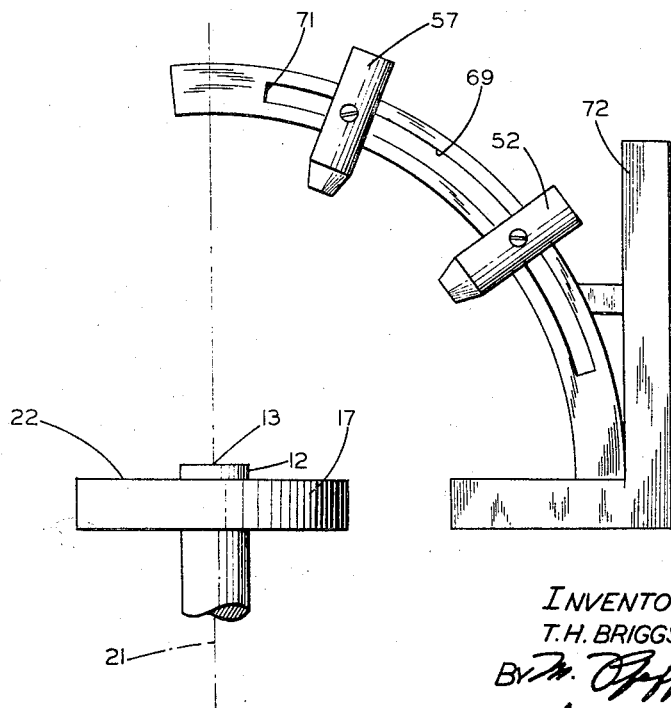
INVENTOR
T.H. BRIGGS
ATTORNEY Oct. 8, 1968  T. H. BRIGGS  3,405,270
INTERNAL FLAW DETECTION USING COLLIMATED BEAMS
Filed Aug. 6, 1965  2 Sheets-Sheet 2

United States Patent Office 3,405,270
Patented Oct. 8, 1968

3,405,270
INTERNAL FLAW DETECTION USING COLLIMATED BEAMS
Thomas H. Briggs, Allentown, Pa., assignor to Western Electric Company, Incorporated, a corporation of New York
Filed Aug. 6, 1965, Ser. No. 477,710
8 Claims. (Cl. 250—83.3)

ABSTRACT OF THE DISCLOSURE

The presence of internal cracks in a body may be ascertained by directing, toward a face of the body, a collimated beam of wave energy to whose frequency the body is transparent. The body is rotated about a normal to the face with a constant angular frequency to cyclically vary the orientation of a crack which may be present therein with respect to the incident beam. A portion of the beam is reflected from the crack with a periodicity determined by the angular frequency of the rotating body, and is suitably detected.

---

This invention relates to methods of and apparatus for detecting internal structural flaws and, more particularly, to methods of and apparatus for detecting internal cracks in silicon bodies. Accordingly, the general objects of the invention are to provide new and improved methods and apparatus of such character.

During the processing of polished silicon slices suitable for the manufacture of diffused junction diodes and transistors, a percentage of the slices has been found to manifest a brittle condition that generally causes subsequent breakage. Such brittleness has been found to be caused by cracks that are formed within the slice prior to or during polishing and particularly by those cracks that begin at the polished surface and extend into the slice.

Past attempts to effectively isolate such cracked slices have been generally unsatisfactory. While certain optical microscopy techniques have been employed with limited success to detect surface flaws in such slices, these techniques have not been found satisfactory for detecting internal flaws. Even where such internal flaws include portions that extend to and intersect the surface of the slice, such techniques have proved inadequate to distinguish the surface portions of such cracks from thin surface scratches, which generally are not serious enough to cause failure of the slice.

One reason for the inability of the prior art optical flaw detection techniques to detect internal cracks in silicon, is that these techniques employ wave energy of visible light frequencies, to which silicon slices of practical thickness are virtually opaque. As a result, such visible light frequencies do not penetrate far enough into the slice to yield a reflection of sufficient magnitude to detect a crack if one exists. It has therefore been necessary to process either inadequately inspected slices or, in the alternative, to reject those ascertainably flawed slices which, if proper inspection techniques were available, might prove to contain only thin surface scratches.

Accordingly, another object of the invention is to provide new and improved methods of and apparatus for detecting internal cracks in materials opaque to visible light frequencies.

Another object of the invention is to provide methods of and apparatus for the simple, rapid and inexpensive, non-destructive detection of internal cracks in silicon slices by the use of wave-energy techniques.

These and other objects of the invention are accomplished by irradiating a body to be tested for internal cracks with wave energy having a frequency for which the body is essentially transparent, and sensing the maximum level of the energy reflected from the body to ascertain if any cracks are present. The maximum level of the energy reflected from the body is of one value if there are one or more internal cracks in the body, and is of a lesser value if there are no cracks in the body.

In one embodiment of the invention employed to test a silicon slice for internal cracks, one face of the slice is irradiated by collimated infrared waves at a predetermined angle to the face. Advantageously, the slice is rotated about a normal to the face with a constant angular frequency to correspondingly vary the orientation of the plane of a crack present therein with respect to the angle of illumination. A portion of any energy reflected from the slice is converted into an electrical signal and passed through a transmission-type filter sharply tuned to the angular frequency of the rotating slice. If a true crack is present in the slice, an electrical signal will appear on an indicator coupled to the output of the filter and tuned to the same angular frequency.

The nature of the present invention, the manner in which it accomplishes the above and related objects, and its various advantages and features are more fully set forth in the following detailed description of several embodiments thereof, taken in connection with the appended drawing, in which:

FIG. 1 illustrates diagrammatically the general principles of the invention;

FIG. 4 is a fragmentary elevation view of an alternative embodiment of the invention.

Figure 2:
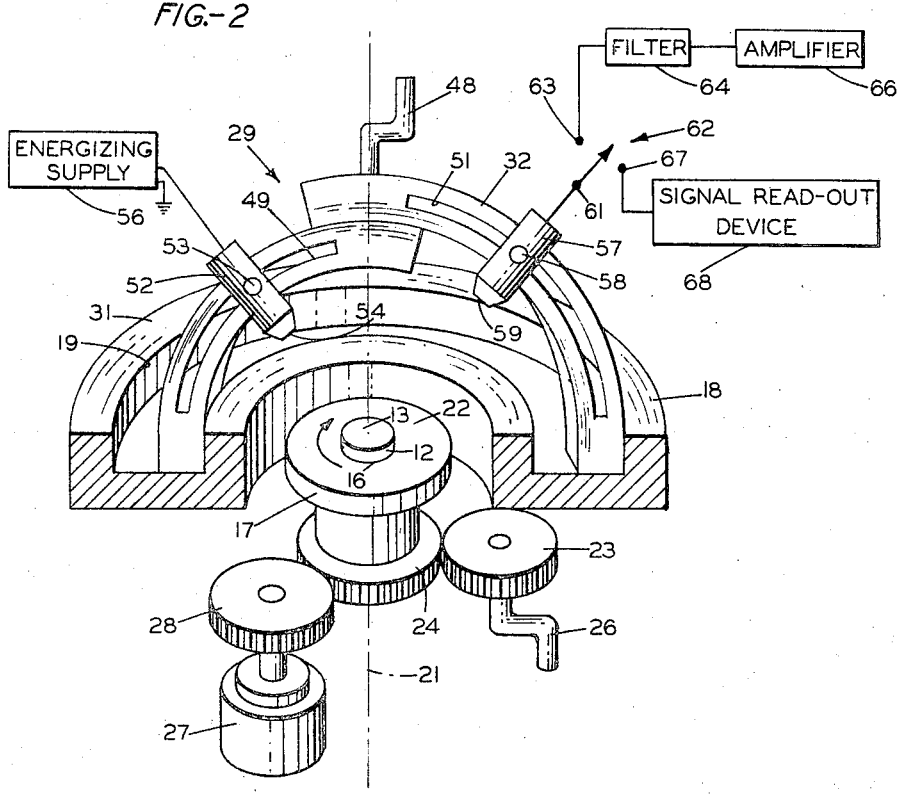
FIG. 2 is a perspective view, partly in section and partly in block diagram form, of one embodiment of the invention for detecting internal cracks in silicon slices.

Referring to FIG. 1, the invention is directed to detecting the presence of an internal structural flaw, such as a crack, in a body 12. Illustratively, the invention will be described in connection with the inspection of polished monocrystalline silicon slices used in the manufacture of transistors and diodes. Accordingly, the body 12 will hereinafter be referred to as "the silicon slice 12."

It has been determined that an internal structural flaw, such as a crack, within a body presents a directive reflecting surface to wave energy penetrating the body and incident upon the crack. The effective area of the surface presented to the energy and thus the amount of energy reflected, is roughly proportional to the size of the crack and the orientation of the crack within the body. In the two most widely used forms of monocrystalline silicon (i.e., those having the so-called 1–1–0 and 1–1–1 crystal structures), cracks tend to occur at angles of 60°, 45° or 90°, respectively, to the polished face of the slice.

Silicon, when utilized in homogeneous slices having a thickness useful for diffused junction device manufacture (e.g., 5 to 10 mils), is virtually opaque to visible light waves but satisfactorily transparent to infrared waves in the 1.5 to 10 micron range.

In accordance with the invention, collimated infrared energy is directed upon a polished face 13 of the silicon slice 12 at a predetermined angle to the face. The incident energy is refracted at the face 13 while passing into the denser medium of the slice 12. If a crack is present in the slice 12, an effective planar reflecting surface 14 is presented thereby to the incoming refracted energy. The surface 14 reflects a portion of the incoming energy, and the reflected energy is again refracted at the face 13 and directed outwardly therefrom to a suitably located infrared detector. Generally, the portion of the incoming refracted energy not reflected by the surface 14, or all of the incident energy if there is no crack, passes through the slice 12 and emerges from a face 16 opposite face 13.

As will be seen below, the emergent energy is absorbed or dissipated by suitable means so that none of this energy is reflected back to the detector.

FIG. 2 depicts a first embodiment of the invention utilizing the above principles for detecting cracks in silicon slices. As shown, a turntable 17 is positioned within and concentric to an annular mount 18. A circumferential track 19 is formed within the mount 18. The turntable 17 is mounted for rotation about an axis 21 normal to a mounting face 22 of the turntable 17, which is preferably coated with infrared absorbing material (not shown). The turntable 17 is rotated by a drive gear 23 that is engageable with a gear 24 mounted at the base of the turntable. A crank 26 is connected to the gear 23 for manually rotating the gear. Alternatively, the gear 24 may be rotated at a constant angular frequency $\omega_1$ by a motor 27 carrying a gear 28 in engagement with the gear 24. The gear 28 can be disengaged from the gear 24 by spring loaded means (not shown) of any suitable type.

Figure 3:
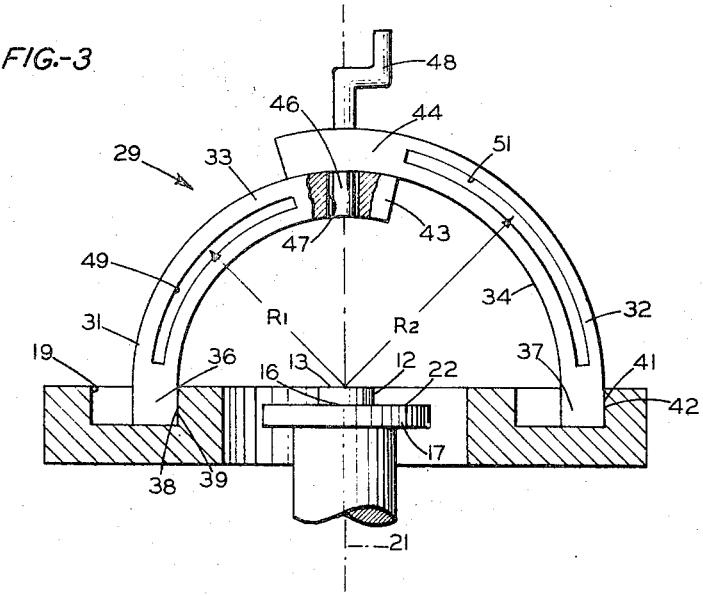
FIG. 3 is a fragmentary elevation view of a portion of the embodiment of FIG. 2.

An angular positioning assembly 29 similar to the type employed in angle measuring instruments, such as goniometers, is movably mounted within the track 19 of the annular mount 18. The assembly 29 will hereinafter be referred to as "the goniometer 29." The goniometer 29 comprises a pair of curved and slotted brackets 31 and 32, each of which is slidable within the track 19. As shown more clearly in FIG. 3, the brackets 31 and 32 define concentric circular segments of different mean radii $R_1$ and $R_2$. The outer surface 33 of the bracket 31 has a radius slightly smaller than that of the inner surface 34 of the bracket 32 to prevent rotational interference of the brackets 31 and 32 within the track 19. The brackets 31 and 32 are provided at like ends with flattened extension portions 36 and 37, respectively, slidably mounted within the track 19. A surface 38 of the extension portion 36 conforms to and bears against the inner surface 39 of the track 19, and a surface 41 of the extension portion 37 conforms to and bears against the outer surface 42 of the track 19. The brackets 31 and 32 are also provided at their other ends with overlapping portions 43 and 44, respectively, centered about the axis 21. The overlapping portion 44 is provided with a projecting portion 46 aligned with and rotatable within a bore 47 in the overlapping portion 43. A crank 48 disposed opposite from and aligned with the projecting portion 46 extends from the overlapping portion 44 to permit manual rotation of the bracket 32 around the axis 21 with respect to the bracket 31. The brackets 31 and 32 are respectively provided with annular slotted portions 49 and 51 intermediate their ends.

Referring again to FIG. 2, suitable infrared source 52 is affixed, as by a pin 53, to the slotted portion 49 of the bracket 31 for irradiating the turntable-mounting face 22. The source 52 is nominally positioned perpendicular to the tangent to the bracket 31 at the mounting point. However, the source may advantageously be pivotally mounted about the pin 53 to permit an added range of adjustment of the angle of illumination. An optical collimator 54 is mounted in front of and aligned with the source 52 to confine the illumination thereof to essentially a single direction. Electrically, the source 52 is connected to a suitable energizing supply 56.

An infrared detector 57 is affixed, as by a pin 58, to the slotted portion 51 of the bracket 32. The detector 57 may be a photocell of the type that converts infrared energy into an electrical output signal. The photocell 57 is nominally positioned perpendicular to the tangent to the bracket 32 at the mounting point; however, the photocell may be pivotally mounted about the pin 58 to provide a limited range of adjustment. Preferably, an optical collimator 59 is mounted in front of and in alignment with the photocell 57 in order to focus any incident infrared radiation.

The output of the photocell 57 is connected to a contact arm 61 of a two-position switch 62. A first contact 63 of the switch 62 is connected to a filter 64 sharply tuned to the angular frequency $\omega_1$. The output of the filter 64 is coupled to an amplifier 66 that is also sharply tuned to the angular frequency $\omega_1$. The output of the amplifier 66 is coupled to a suitable indicator device (not shown). A second contact 67 of the switch 62 is directly connected to a read-out device 68, such as a chart recorder.

In one method of operation of the above-described embodiment, the unpolished face 16 of the silicon slice 12 to be inspected is affixed to the infrared absorbing mounting face 22 of the turntable 17 so that the opposite (polished) face 13 of the slice 12 is exposed to the infrared source 52 and faces the photocell 57. Infrared energy from the source 52 is collimated by the lens 54 and is directed upon the polished face 13 at a predetermined angle to the axis 21. As shown in FIG. 1, the incident energy is refracted while passing into the denser medium of the slice 12. If a crack is present in the slice 12, the effective reflecting plane 14 thereof reflects a portion of the incoming energy roughly in proportion to the size of the crack. Some of the reflected energy is refracted at the face 13 toward the photocell 57.

The gear 28 carried by the motor 27 is placed in engagement with the gear 23 of the turntable 17 thereby rotating the turntable at the constant speed $\omega_1$. The switch 62 is adjusted so that the contact arm 61 registers with the first contact 63.

Since the turntable 17 is rotated at the constant speed $\omega_1$ with respect to the fixed source 52 and the photocell 57, the slice 12 and the reflecting plane 14 also rotate at $\omega_1$. The planar reflecting surface 14 of the crack, being highly directive, thus reflects a maximum amplitude of infrared energy to the photocell 57 once each revolution. As a result, the photocell 57 generates a pulsating output signal having a pulse reptition rate corresponding to the angular frequency $\omega_1$. This output signal is transmitted through the filter 64 to be amplified and read out by the amplifier 66.

In order to maximize the amount of reflected energy detected, the crank 48 is rotated to locate the optimum circumferential orientation of the photocell 57 with respect to the source 52. If desired, the respective mounting positions of source 52 and/or photocell 57 may be varied along the associated slotted portions 49 and 51.

It has been found that where a large plurality of slices of the same type of crystal structure are to be inspected, the angles formed by typical cracks in such slices with respect to their respective polished surfaces are statistically determinable within narrow limits. For example, in a run of typical silicon samples containing detectable cracks, about 80 percent of the observed cracks were oriented at an angle of between 45° and 60° to the polished surface of the associated slices. Moreover, in practically all of the flawed samples, the cracks were oriented at angles of between 40° to 70° to the polished surface. Since the range of adjustment of illumination and detection angles is small and relatively predictable in a given production run, a rapid inspection of any one type of polished slice may be obtained without an undue amount of adjustment.

The above-described arrangement is especially useful in distinguishing surface scratches from internal cracks that extend to and intersect the surface. It has been found that a scratch on the polished surface of a slice under test tends to scatter the wave energy randomly, so that more than one maximum of reflection occurs during each turntable revolution. In other words, the reflected energy from such a scratch, under these conditions of rotation, has a pulse repetition rate greater than $\omega_1$, which corresponds to one maximum per cycle. Since the photocell 57 is coupled to circuits sharply tuned to $\omega_1$, no indication of such scratch-reflected energy will occur.

An alternative way of distinguishing surface scratches from internal cracks is by amplitude discrimination. In view of the energy scattering nature of surface scratches, the amplitude level of the reflected energy from a surface scratch, even at a maximum point, will be less than that from an internal scratch. Accordingly, by placing the contact arm 61 of the switch 62 in registration with the second contact 67 and observing the output of the read-out device 68, surface scratches may be distinguished from cracks. This method of direct readout of the reflected infrared energy may also be used to determine whether there is more than one crack present in the slice. In this instance, the number of amplitude maxima observed over a predetermined level, during each revolution, indicates the number of cracks in the slice.

Another method of utilizing the above-described embodiment for crack inspection purposes is to place the motor gear 28 out of engagement with the turntable gear 24 and to operate the switch 62 so that the contact arm 61 registers with the second contact 67. In this case, the turntable 17 is manually positioned by means of the crank 26 until, if a crack is present, a steady maximum response appears on the read-out device 68. As described above, further adjustments of the amount of reflected energy detected may be obtained by (1) rotating the crank 48 to vary the orientation of the photocell 57 with respect to the source 52, and/or (2) varying the respective mounting positions of the photocell 57 and/or the source 52 along their associated slotted portions 51 and 49.

FIG. 4 shows an alternative embodiment of the invention which is useful where somewhat less freedom of adjustment of the reflected energy may be tolerated. In this embodiment, the source 52 and the photocell 57 are both affixed to a slotted portion 69 of a single curved support 71. As shown, the curved support 71 is mounted on an angle bracket 72 in concentric relation with a point on the axis 21 adjacent to the turntable 17. The operation of this embodiment is identical to that described in connection with FIGS. 1, 2 and 3, except for the circumferential adjustment provided by the track 19.

It is to be understood that the above-described embodiments are merely illustrative of the principles of the invention, and that various modifications may be made from the specific details described without departing from the scope and spirit of the invention.

What is claimed is:
1. A method of detecting internal cracks in a body, which comprises the steps of:
    directing through the body a collimated beam of wave energy having a frequency for which the body is normally transparent to reflect a portion of the beam from an internal crack in the body;
    imparting relative motion between the beam and the body to modulate the amplitude of the reflected beam portion when a crack is present in the body;
    sensing the amplitude of the beam portion reflected from the body during the relative motion between the beam and the body to ascertain the presence of a crack therein.
2. A method according to claim 1 wherein the body is essentially transparent to infrared energy and the wave energy has a frequency within the infrared spectrum.

3. A method of detecting internal cracks in a slice that is transparent to and non-absorptive of infrared energy, which comprises the steps of:
    directing, toward one face of the slice, a collimated beam of infrared energy to reflect a portion of the beam from each internal crack in the slice;
    rotating the slice about a normal to the face; and
    detecting, during each revolution, the number and amplitude maxima of the beam portions reflected from the slice to ascertain the presence and number of cracks in the slice.
4. A method of detecting internal cracks in a slice that is transparent to and non-absorptive of infrared energy, which comprises the steps of:
    directing, through the slice, a collimated beam of infrared energy to reflect a portion of the beam from an internal crack in the slice;
    rotating the slice with a fixed angular periodicity about a normal thereto for imparting, to the reflected beam portion, a first component having the fixed angular periodicity; and
    detecting the first component of the reflected beam portion.
5. A method according to claim 4, in which the slice consists of monocrystalline silicon.
6. Apparatus for detecting cracks in a body that is essentially transparent to infrared energy, which comprises:
    means for supporting the body for rotation about a normal to a first face of the body;
    a source of infrared energy for irradiating the body at a first angle to the normal;
    first means movable along a path substantially concentric with a point on the normal for supporting the source;
    detecting means for sensing infrared energy reflected from the body at a second angle to the normal; and
    second means movable along a path substantially concentric with the same normal point for supporting the detecting means.
7. Apparatus as defined in claim 6, wherein the first supporting means includes an infrared absorbing surface affixed to the face of the slice opposite the first face.
8. Apparatus as defined in claim 6, wherein the detecting means are sensitive only to components of infrared energy occurring at a predetermined angular frequency, and the apparatus further comprises means for rotating the body about the normal at the predetermined angular frequency.

References Cited
UNITED STATES PATENTS

| | | | |
|---|---|---|---|
| 2,318,667 | 5/1943 | Bruce | 250—51.5 X |
| 2,677,106 | 4/1954 | Haynes et al. | 250—83.3 X |
| 2,750,512 | 6/1956 | Meloy | 250—51.5 |
| 2,755,702 | 7/1956 | Cook | 250—224 X |
| 3,206,603 | 9/1965 | Mauro | 250—83.3 |
| 3,328,000 | 6/1967 | Rottmann | 250—223 |

ARCHIE R. BORCHELT, *Primary Examiner.*